(12) United States Patent
Borthakur

(10) Patent No.: US 9,356,883 B1
(45) Date of Patent: May 31, 2016

(54) ALLOCATING CLOUD-HOSTED APPLICATION RESOURCES USING END-USER METRICS

(71) Applicant: Amazon Technologies, Inc., Reno, NV (US)

(72) Inventor: Apolak Borthakur, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 187 days.

(21) Appl. No.: 14/290,670

(22) Filed: May 29, 2014

(51) Int. Cl.
*G06F 15/173* (2006.01)
*H04L 12/911* (2013.01)

(52) U.S. Cl.
CPC ...................................... *H04L 47/70* (2013.01)

(58) Field of Classification Search
CPC ..... G06F 9/5011; G06F 9/5061; G06F 11/30; G06F 2209/503; G06F 9/505; G06F 9/5072; H04L 41/145; H04L 43/08; H04L 67/1002; H04L 67/1008; H04L 67/1012; H04L 67/1031
See application file for complete search history.

(56) References Cited

U.S. PATENT DOCUMENTS

| | | | | |
|---|---|---|---|---|
| 8,214,238 B1* | 7/2012 | Fairfield | ............... | G06Q 10/063 705/7.11 |
| 8,527,327 B1* | 9/2013 | Lawrence | ............ | G06Q 10/103 705/7.27 |
| 8,572,612 B2 | 10/2013 | Kern | | |
| 8,612,599 B2 | 12/2013 | Tung et al. | | |
| 2010/0306767 A1 | 12/2010 | Dehaan | | |
| 2011/0078303 A1 | 3/2011 | Li et al. | | |
| 2012/0173709 A1 | 7/2012 | Li et al. | | |
| 2013/0007753 A1* | 1/2013 | Jain | ........................... | G06F 9/46 718/103 |
| 2013/0174146 A1 | 7/2013 | Dasgupta et al. | | |
| 2013/0174168 A1* | 7/2013 | Abuelsaad | ............ | G06F 9/5072 718/102 |
| 2013/0254384 A1* | 9/2013 | Wray | ..................... | H04L 43/08 709/224 |
| 2014/0279201 A1* | 9/2014 | Iyoob | ................. | G06Q 30/0631 705/26.7 |
| 2014/0317172 A1* | 10/2014 | Granshaw | ........... | H04L 67/1008 709/203 |

FOREIGN PATENT DOCUMENTS

WO 2013185175 12/2013

OTHER PUBLICATIONS

Amazon Web Services, "Auto Scaling; Getting Started Guide API Version", Jan. 1, 2011, pp. 1-17.
Amazon Web Services, "AWS Elastic Beanstalk; Developer Guide API Version", Dec. 1, 2010, pp. 1-632.

* cited by examiner

*Primary Examiner* — Peling Shaw
(74) *Attorney, Agent, or Firm* — Robert C. Kowert; Meyertons, Hood, Kivlin, Kowert & Goetzel, P.C.

(57) ABSTRACT

At least one workflow comprising end-user interactions with an application implemented using provider network resources is identified by a resource allocation service of the provider network. The service collects performance metrics associated with the end-user workflow. If a performance metric meets a threshold criterion, a re-evaluation of the resources assigned to the application is initiated. Configuration changes to modify the set of provider network resources assigned to the application are implemented in accordance with a result of the resource re-evaluation.

20 Claims, 9 Drawing Sheets

ALLOCATING CLOUD-HOSTED APPLICATION RESOURCES USING END-USER METRICS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Some provider network operators allow customers to choose from among several different categories of virtualized compute servers as well as other types of resources, each with different levels of advertised performance and/or functional capabilities. However, from the perspective of vendors using the provider network resources to host their applications, decisions as to which categories of resources should be used for various application components may not be easy to make, especially in scenarios in which application workload characteristics change over time.

Figure 1:
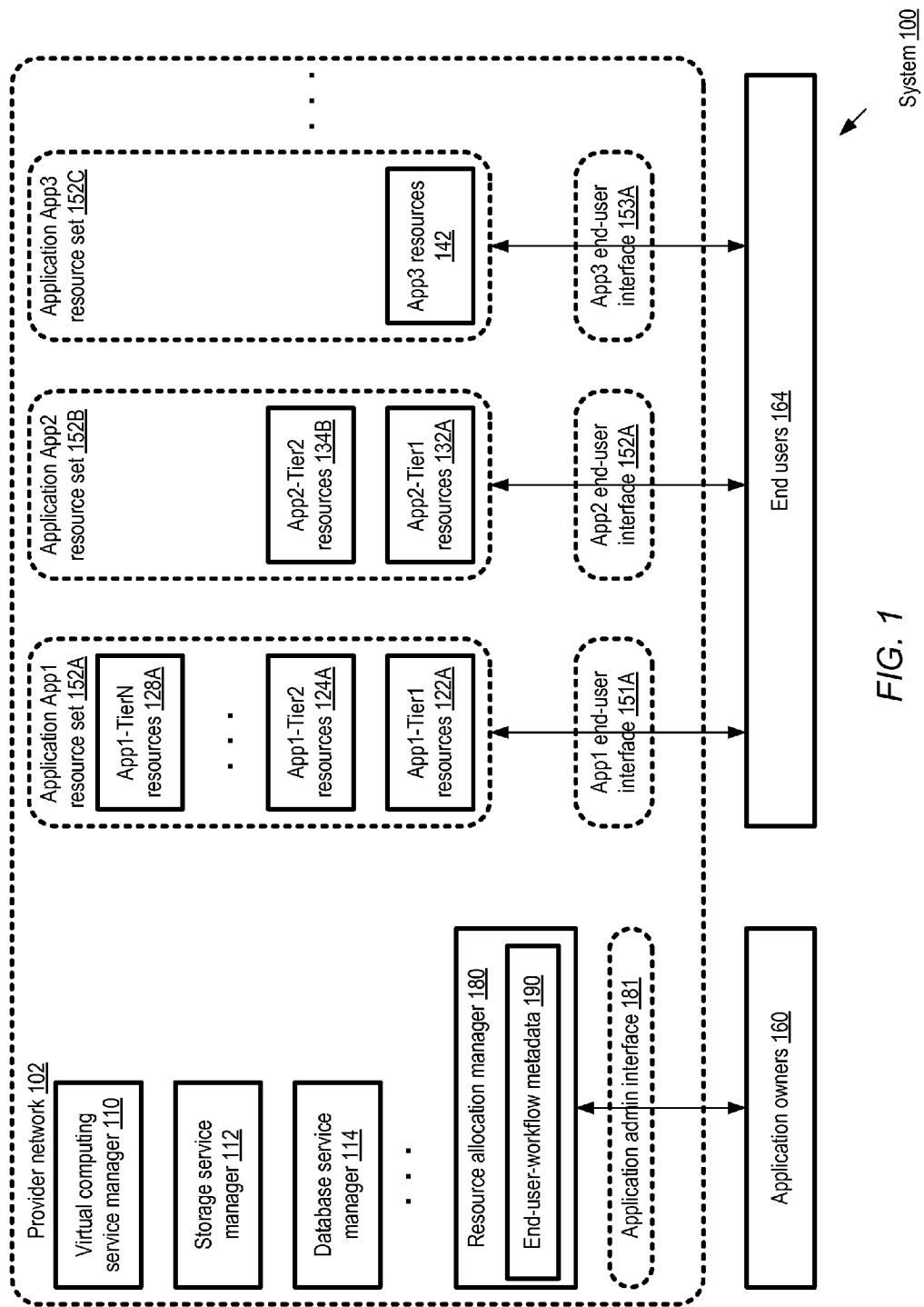
FIG. 1 illustrates an example system environment in which a resource allocation manager of a provider network may assign resources to applications based on end-user workflow metrics, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for modifying application resource allocations in provider network environments based on metrics collected for end-user workflows are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. At least some of the provider network resources may be used by application vendors (who may also referred to herein as application owners) to host applications accessible by end users from around the Internet or from other parts of the provider network. Thus, provider networks may in general have both direct and indirect customers: application vendors as direct customers, and end users who use the vendors' applications as indirect customers. In addition, some applications or services of the provider network may be used by end users directly in at least some embodiments. Within large provider networks, some data centers may be located in different cities, states or countries than others, and in some embodiments the resources allocated to a given application may be distributed among several such locations to achieve desired levels of availability, fault-resilience and performance.

In at least some embodiments, the resources of one or more provider network services may be packaged into resource categories with different performance and/or functional capabilities—e.g., virtualized computing servers offered by a computing service may be bundled into several different compute instance categories, storage space offered by a storage service may be bundled into containers or volumes of different sizes and maximum supported I/O (input/output) operation rates, and so on. Application vendors that wish to utilize the provider network's services to host their application stacks may select the resources from the supported categories for various tiers or layers of their applications in some embodiments. Application owners may also or instead use a deployment service of the provider network in some embodiments as described below, allowing the deployment service to select at least the initial set of resources from various supported categories, without necessarily making the deployment service aware of end-user workflows. Each of the resource categories may have a corresponding pricing or billing policy, with resources belonging to higher-performance categories (or categories capable of performing specialized types of tasks such as high-performance parallel programming tasks) typically costing more than those belonging to less performant categories. Application vendors may thus have to make tradeoffs between ensuring that sufficient resources are allocated for their applications to handle end-user workloads (which may vary both in the short term and in the long term), and avoiding overprovisioning resources (which could result in unnecessarily high billing amounts). Application vendors may sometimes attempt to estimate their resource need trends by running tests to determine the capacity of the currently-allocated resources and projecting future workload changes. However, emulating end user workloads is a non-trivial task that may incur substantial costs, and projections of workload changes are often error-prone. For most complex applications with multiple tiers, testing all of (or even a significant fraction of) the different combinations of resource categories that could be selected for different tiers may require more effort than application vendors can typically afford. At the same time, under-provisioning or over-provisioning resources for their applications may have severe negative consequences, such as loss of customers due to unsatisfactory user experiences or budget overruns resulting from allocating more resources than required. Furthermore, while application vendors may be familiar with the internals of their applications and the way in which their applications are used, in general they may be less knowledgeable about how specific changes in provider network resource allocations impact the application behavior as perceived by the end users of their applications.

As mentioned above, instead of explicitly selecting resources, in some embodiments application owners may provide executable versions of their applications to a deployment service of the provider network, and the deployment service may select at least the initial set of resources to be used for each tier, based for example on application topology definitions or other metadata provided by the application owners. However, at least in some conventional provider network environments, even in scenarios in which the deployment service (or other provider network services such as automated scaling services) are used for assigning resources to applications, resource allocation decisions may typically have to be made without the benefit of an analysis of end-user workflow metrics that could be affected by those decisions.

Accordingly, in at least some embodiments, the provider network operator may implement a resource allocation service that is capable of modifying resource allocations to meet end-user application workflow performance requirements. For example, in one embodiment the application owner or vendor may indicate, via a programmatic interface, a set of one or more end-user workflows or interaction sequences whose performance is considered important or critical for the successful implementation of a given application. The programmatic interface may, for example, include one or more web pages, an application programming interface (API) such as a web services API, a command-line tool, or a custom graphical user interface (GUI). For a web-based application such as an online retail store, for example, sequences of web page accesses and form submissions may be specified as the characteristic workflows of greatest interest. The workflows may include write requests (e.g., form submissions in the case of web-based applications) as well as read requests in some cases, while in other cases at least some of the workflows may be read-only. In one embodiment, after an initial set of resources is allocated for an application at the provider network and has been used by end users for some time, application logs may be examined by the resource allocation service to identify important workflow sequences. The performance requirements for a given workflow (or for components of the workflow such as individual page views or form submission acknowledgements) may be provided to the resource allocation service by the application owner in some embodiments, while in other embodiments, the service may be able to deduce the requirements based on analysis of application logs. In one simple implementation, an application owner may provide an indication of an application's executable (or several executables for respective application tiers), and a guideline regarding end-user workflow performance requirements (e.g., the application owner may submit a web form or an API request indicating that at least 99% of the end-user page views of the application should each take no more than five seconds). In such an implementation, the resource allocation service may be responsible for allocating sufficient resources to ensure that the specified end-user workflow goals continue to be met, even if the end-user workload changes substantially over time. Various types of end-user workflow performance requirements or goals may be identified, including responsiveness-related metrics, throughput-related metrics, and so on.

The resource allocation service may comprise a number of different hardware and/or software components, some of which may be distributed across various data centers of the provider network, and may utilize existing tools and administrative infrastructure available within the provider network to collect metrics associated with the application. For example, in some embodiments, a respective set of one or more resource allocation managers may be established within each data center of the provider network, and each resource allocation manager may obtain performance metrics from monitoring agents established by the different provider network services for managing service resources. In one embodiment, a respective resource allocation manager may be established or configured for each application, while in other embodiments, a single resource allocation manager may be instantiated for several different applications. In some embodiments, respective alerts or families of related alerts may be defined at various resources used by different application tiers, and the alerts may be included among the set of metrics collected by the resource allocation managers. For example, the resource allocation service may establish bands of normalcy for resource utilization levels for various infrastructure resources in some embodiments, and may set alerts when the utilization levels fall outside the bands of normalcy. The term "performance metric" as used herein may include, for example, response times for completing various types of end-user requests or components of such requests, throughput for various types of end-user requests, the output of various types of performance tools for specific provider network infrastructure elements such as CPUs, disks, memory and the like, event count metrics such as the number of alerts of a particular type generated per time interval, and so on. A resource allocation manager may be responsible for correlating collected metrics (e.g., performance measures, log entries, and/or alerts) with the performance goals of the end user workflows, and estimating/confirming the impact of various types of resource allocation changes on the goals.

In one embodiment, in response to determining that some set of metrics associated with a given application has met a threshold criterion, a resource allocation manager may determine that a re-evaluation analysis should be performed to determine whether the current set of resources allocated to the application should be changed. For example, consider a scenario in which a multi-tier application with a web server tier, and application server tier, and a database tier is implemented using provider network resources. The resource allocation manager may collect measures of how long various database queries or transactions take at the database tier, how long various application server middleware API (application programming interface) calls take at the application server tier, how long web servers take to collect content components of each page, and so on. In addition, the resource allocation manager may collect metrics on various hardware and/or software resources at the different tiers, such as CPU utilization, memory utilization, disk utilization, network bandwidth usage levels, and the like, as well as alerts or log messages generated at the different resources and application components. The resource allocation manager may determine which specific database operations, application server tier operations, and web operations are involved in responding to the requests included within an end-user workflow whose performance is to (at least potentially) influence resource re-allocation decisions. In one example scenario, if the response time for a query associated with the selected workflow at the database tier exceeds X milliseconds consistently or repeatedly over some time interval T, where X is a threshold determined by the resource allocation manager, a re-evaluation of database tier resources may be initiated. In another example scenario, if the overall page generation response time of a particular web page (for which content is retrieved from the database tier via the application server tier) associated with the selected workflow exceeds N seconds, resource re-evaluation of all three tiers of the application may be initiated.

As part of the resource re-evaluation analysis, the resource allocation manager may attempt to identify the root cause of the re-evaluation triggering condition in some embodiments—i.e., the causes that may have led to the metric threshold being met or exceeded. This may require correlating metrics from a variety of sources, identifying time windows of relevant metrics as described below, tracing probable event causes across different application tiers, and so on. In some cases, the result of the analysis may indicate that a different set of resources should be deployed at one or more application tiers. For example, more resources (or more performant resources) may be needed at the database tier to reduce the time it takes to respond to a query associated with an end-user workflow of interest. In some cases, especially for multi-tier applications, the re-evaluation analysis may reveal that some resources are underutilized, and in such scenarios a replacement of a given set of resources by less-performant (and hence potentially cheaper) resources may be advisable. Depending on the results of the re-evaluation, one or more application configuration changes may implemented—e.g., a more powerful hardware server or compute instance may be configured for one tier than is currently being used, application components may be consolidated onto fewer servers or instances, and so on.

In at least some embodiments, as mentioned earlier, the application owner may specify the end-user workflows of most interest programmatically to the resource allocation service. In one implementation, for example, an interaction recording tool may be provided to the application owner. Using the recording tool, the application owner may record a sequence of end-user interactions and provide the recording as a representation of a workflow to the service. In the case of a web-based application involving one or more HTTP (Hypertext Transfer Protocol) request/response sequences, for example, a sequence of HTTP URLs (Uniform Record Locators) and/or typical form field values submitted by an end-user may be obtained as the output of the recording. In other embodiments, other types of programmatic interfaces may be used to indicate the end-user workflows to be considered when making resource allocation/re-allocation decisions: for example, for applications in which a command-line interface (CLI) is used for work requests submitted by end-users, a script or sequence of commands of a workflow may be obtained by the service. In some embodiments, a resource allocation manager may receive an indication of an end-user workflow, such as a sequence of HTTP web requests or CLI requests, and translate the end-user requests into internal operations that are performed at various layers or tiers of the application in order to correlate resource usage with the end-user workflows. For example, the relationship $R = EUR \rightarrow \{OT1, OT2, OT3\}$ between an end-user request EUR and sets of application operations OT1, OT2, OT3 at respective tiers T1, T2 and T3 of an application may be determined. A representation of the relationship R may be stored as part of end-user workflow metadata for use during resource re-evaluation analysis in such a scenario.

In some embodiments, the application owner may also programmatically specify performance requirements and/or thresholds for each step of a workflow, or of a workflow as a whole. For example, for a web-based application, the owner may indicate that each web page should be rendered within 3 seconds at least 90% of the time, or that a response to a search should take no more than 1 second, or that a confirmation of a submitted form should take no more than 1 second. In other embodiments, the resource allocation service may analyze logs and/or metrics related to an application to determine performance statistics about various workflow components (such as browsing requests, searches, or form submissions) during low workload periods and estimate the thresholds that should be set for the components and/or the workflow as a whole. In at least one implementation in which the service estimates the performance requirements or thresholds, the requirements may be provided to the application owner for confirmation or modification.

In one embodiment, the resource allocation service may attempt to avoid making changes to application resource assignments based solely on short-term performance variations, and may instead verify that observed changes to one or more metrics are sustained before taking any corrective actions. For example, for a web-based application for which a page generation response time threshold of 3 seconds per page is defined as a trigger for resource re-evaluation, in one embodiment the service may verify that at least M out of N page generation response times within a time interval T exceeded the 3-second threshold before initiating resource re-evaluation. In some embodiments, the resource allocation service may inject artificial or synthetic requests (intended to emulate end-user interactions) into an application's workload from some set of test devices, and may use such synthetic requests to obtain a more controlled set of measures over some number of request repetitions than might have been possible if only actual end-user metrics were used. Other statistical techniques may be used to determine whether a change to a metric is significant enough to justify resource re-evaluations in other embodiments. In some embodiments, machine learning techniques may be used to enhance the effectiveness of the resource allocation service over time. For example, the relationships between parameters used for triggering resource re-evaluations, the costs of the re-evaluations (e.g., as measured in CPU usage at the resource allocation managers), the costs of the resource allocation changes, and the effects of the resource allocation changes on end-user workflow performance may all be examined using machine learning. Feedback from the machine learning components of the service may be used to adjust the triggering parameters, the types of metrics collected or the manner in which the metrics are collected, the types of resource allocation change actions that are taken, and so on.

A variety of different types of data sources may be used to collect the metrics to be used for triggering and implementing resource re-evaluation analyses. In some embodiments, performance monitoring agents may be configured at the provider network resources (e.g., compute instances, storage devices and the like) at various tiers of the application, and/or at networking devices used for communications between the different tiers and between end-users and the customer-facing tier of the application. By instrumenting the networking software stack or a hardware networking component at a customer-facing application tier, for example, at least an approximate measure of the total time taken between receiving a particular end-user request and transmitting a corresponding response to it may be obtained. In some embodiments, at least a subset of network devices (e.g., gateways, switches or routers) through which end-user requests and responses are transmitted may be instrumented to collect even more accurate estimates of responsiveness metrics. In at least one embodiment, a set of test devices may be configured (e.g., either within the provider network, or at premises external to the provider network) to emulate end-user interactions corresponding to workflows of interest. The test devices may thus act as additional request sources, presenting similar requests to those that might have been generated by real end users, but differing from real end users in that the scheduling of the requests may be controlled by the resource allocation service. Metrics collected at such test devices, such as the total time taken by the application to respond to various workflow requests, may serve as a good approximation of actual end-user experience, especially in cases where the test devices are located outside the provider network. In one embodiment, the application owner may instrument client-side components of an application to collect actual response times for various requests in production environments, and may provide such measurements to the service. The service may correlate such externally-collected response times with the metrics and log entries collected internally within the provider network for resource re-evaluation purposes.

For complex multi-tier applications with dozens or hundreds of metric data sources and hundreds or thousands of concurrent end users, even a short period of metrics collection may potentially result in a large volume of data for analysis by the resource allocation managers. Accordingly, any combination of several filtering approaches may be used to limit the set of metrics that should be analyzed in response to a given triggering condition or event. In at least some embodiments, application topology information and/or relevance time windows may be used for such filtering. For example, for a given type of alert generated at time T from a data source Di, the resource allocation service may define a corresponding relevance time window delta_T, such that only those metrics or alerts that were generated during the periods (T minus delta_T→T) (or (T→T plus delta_T)) at some set of data sources {Dk} need be examined for causal analysis of the alert. In some implementations, different relevance time windows may be defined for different data sources. In at least one embodiment, the topology of the application may be taken into account for filtering the collected metrics—e.g., if a re-evaluation triggering criterion is met an application server tier, and the application server layer API involved submitted a query to a database tier, the set of database tier metrics that could have led to the triggering criterion being met may be analyzed. Relevance time windows may be defined across multiple application tiers taking application topology into account—e.g., a relevance time window TW2 at tier T2 may be defined for an alert A1 generated at tier T1. The order in which logged events, metrics or alerts from different application tiers are analyzed may be chosen based at least in part on application topology in some embodiments. For example, to determine the cause of an event at an application server tier, it may make more sense to analyze a database tier event first, instead of analyzing other events at the application server tier or any events at the web server tier. A representation of the application topology may be stored in a persistent workload metadata repository in some embodiments together with workflow definitions, thresholds and other information used for resource re-evaluations.

Example System Environment

FIG. 1 illustrates an example system environment in which a resource allocation manager of a provider network may assign resources to applications based on end-user workflow metrics, according to at least some embodiments. As shown, system 100 may include a provider network 102 at which a number of different network-accessible services, such as a virtual computing service, one or more storage services, one or more database services and the like may be implemented. Respective service managers may be responsible for coordinating the operations of the different services—e.g., a virtual computing service manager 110 may control the virtual computing service, a storage service manager 112 may coordinate storage service administration, and a database service manager 114 may administer the database service.

In the depicted embodiment, some customers of the provider network may use respective sets of the provider network service resources to host applications that can in turn be used by end users. Such customers, on whose behalf applications are hosted using provider network resources, may be termed "application owners" 160 herein. At least some applications may be organized in multiple tiers, with each tier performing a logically distinct subset of the application's functions using some combination of provider network resources. The resource set 152A used for application App1 is shown divided into N tiers, for example, including App1-Tier1 resources 122A, App1-Tier2 resources 124A, and App1-TierN resources 128A. The resource set 152B used for application App2 comprises two tiers: App2-Tier1 resources 132A and App2-Tier2 resources 134B. The resources allocated to some applications, such as App3 resources 142, may not necessarily be organized in multiple tiers. A given tier of a given application may comprise some combination of resources of different services of the provider network. Respective network paths may connect the different tiers of an application, and at least one tier of any given application may be accessible via network paths from end users 164 in the depicted embodiment. Although end users 164 are shown outside the provider network 102 in FIG. 1, at least some end users may access the applications from within the provider network in some embodiments—e.g., work requests may be directed to App1-Tier1 from App2-Tier2, or from compute instances managed by the virtual computing service.

Applications App1, App2 and App3 may each implement respective end-user interfaces 151A, 151B and 151C in the embodiment shown in FIG. 1. For example, web-based end-user interfaces may be used for some applications, enabling end users to submit HTTP or HTTPS requests via browsers and receive corresponding responses. Command-line tools, APIs, or custom GUIs (graphical user interfaces) may be implemented in other embodiments. End users 164 may submit application requests, and receive response to the submitted requests, via the interfaces 151.

Figure 2:
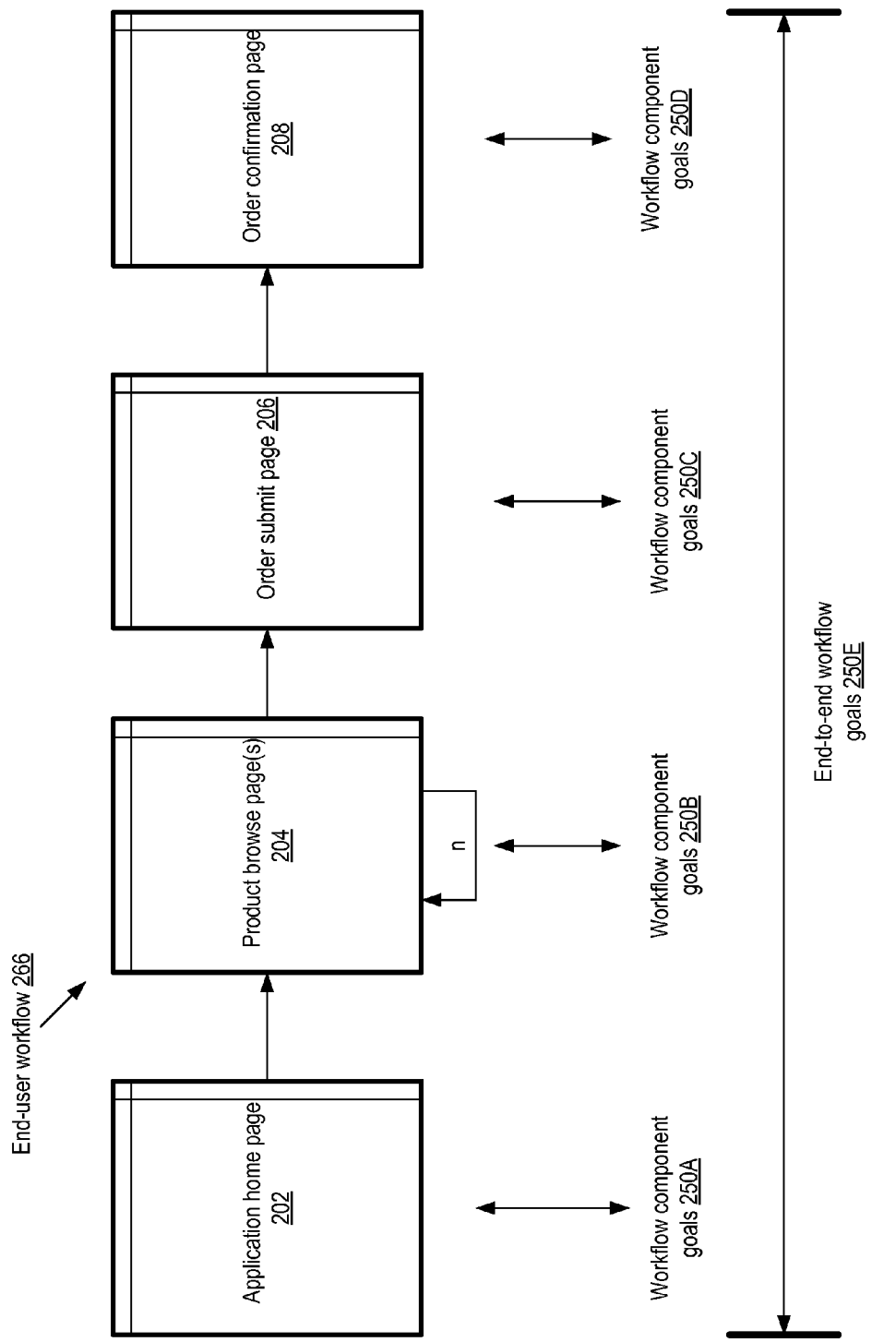
FIG. 2 illustrates of an example application workflow from an end-user perspective, which may be used for resource assignment decisions according to at least some embodiments.

According to some embodiments, a resource allocation manager 180 may be established at the provider network to help assign or reassign resources to the applications App1, App2, etc., based at least in part on how well the end-user performance requirements or goals of the applications are being met. A resource allocation service of which the resource allocation manager is a subcomponent may implement an administrative interface 181 allowing the application owners 160 to programmatically indicate important end-user workflows for respective applications (e.g., App1, App2, or App3) in some embodiments. An end-user workflow may be defined, for example, as a sequence or graph of interactions or request-response pairs between a client device (e.g., a desktop, laptop, tablet, smartphone or the like) and an application implemented at the provider network 102. An example of a web-based end-user workflow is shown in FIG. 2 and described in further detail below. In addition to, or instead of, being used for defining the workflows whose performance is to be taken into account when making resource assignment change decisions, the administrative interface 181 may also be used for providing other types of guidance to the resource allocation service in some embodiments. For example, application owners may specify respective performance goals/requirements, triggering threshold levels for various measures or events that should be used to re-evaluate current resource assignments, constraints on the types of resource allocation changes the service is permitted to make on their behalf, and so on. In one embodiment, for example, in which the provider network resource costs or billing amounts for various assignable resources are based at least in part on the performance capabilities of the resources, the application owners 160 may specify budget constraints for resource assignment modifications. For example, the owner of App1 may indicate to the resource allocation service that resource allocation changes at Tier1 or Tier2 may be made without further approval from the owner as long as the changes do not result in added billing costs of $X for the next month. Continuing the example, App1's owner may specify via interface 181 that if changes that would result in a higher additional billing cost are deemed advisable by the service, explicit permission may need to be obtained from App1's owner. End-user workflow metadata 190 comprising the definitions of the workflows of interests, associated thresholds and/or constraints may be stored in a persistent repository of the resource allocation service in at least some embodiments.

In some embodiments, various services implemented at the provider network may have metrics collection agents configured for their resources, e.g., to implement usage-based billing, to help balance workloads, to improve hardware utilization levels, and so on. For example, each host being used for compute instances by the virtual computing service may comprise one or more local metrics-collecting processes for CPU, memory, disk, and/or network usage, as well as for metrics pertaining to operating system data structures such as open files/sockets and the like. Each instance and/or instance host may comprise some number of logging processes as well in some embodiments. The logging processes may generate configurable log messages and/or alerts that may also be used for resource assignment purposes. Various hardware and/or software networking components may also be instrumented to collect performance data and/or events pertaining to end-user workflows in some implementations. The resource allocation manager 180 may utilize the output of various combinations of these different types of metrics collectors and logs to ascertain the probable causes of changes in end-user workflow performance in some embodiments. The resource allocation manager 180 may also utilize other metrics sources—e.g., results of tests set up to emulate end-user workflows may be used in some embodiments as described below. In at least one embodiment, application owners 160 may provide the service with end-user workflow metrics collected from the end users' client devices, and if a predefined condition that triggers resource assignment re-evaluation is met, the service may then correlate the actual end-user results with metrics and event records generated within the provider network to determine whether any resource assignments should be changed.

In one embodiment, the provider network may implement programmatic interfaces that enable application owners 160 to configure an initial resource set 152 for a given application, e.g., using a scripting language that defines the tiers of the application, the initial set of resources to be deployed at each layer, and various aspects of the resource configurations at each layer and the connectivity between layers. The application owner 160 may use such an interface to establish an initial configuration comprising some number of application tiers. The application owner may then indicate, e.g., using administrative interface 181, the end-user workflows whose performance should be used to modify the initial configuration automatically if needed, and then allow the resource allocation manager 180 to coordinate such automated reconfigurations. In some embodiments, as mentioned earlier, a deployment service of the provider network may select the initial resource set 152 on behalf of the application owner. In some implementations, when specifying the application executables to such a deployment service, the application owner may also be able to indicate the end-user workflows and/or the workflow goals/metrics/thresholds to be considered for resource allocation decisions. A set of triggering conditions or constraints based on end-user requirements may be determined by the resource allocation manager 180 (e.g., either as a result of the application owner indicating the conditions, or based on analysis of application logs by the resource allocation manager 180). The resource allocation manager 180 may identify the specific subsets of metrics, alerts, log messages and the like that are associated most closely with the end-user workflows of interest, and start collecting and analyzing such metrics. In some cases all of the relevant metrics may already be collected for other purposes (e.g., for usage-related billing), and the resource allocation manager 180 may not have to instantiate any additional metrics agents; in other cases, new metrics collection agents or processes may be instantiated at the request of the resource allocation manager.

If one or more of the collected metrics meet a threshold condition, a re-evaluation of the resources allocated to the corresponding application may be initiated in some embodiments. Different types of threshold criteria may apply, depending on the nature of the metric being considered. For example, for some types of alerts, more than 10 alert occurrences within a 5-minute period may be considered a threshold. For CPU or disk utilization, a sustained utilization level above 75% for a particular resource used to respond to the end-user workflow may be deemed a threshold in some example scenarios. During the re-evaluation analysis, the resource allocation manager 180 may use various techniques to try to isolate the cause or causes that led to the threshold condition, e.g., using application topology information and/or relevance time windows to reduce the size of the data set to be analyzed. In some cases, a sub-optimal allocation of resources may be identified as the likely cause, and the resource allocation manager may be able to identify a resource allocation change that is considered likely to help alleviate the problem. In some embodiments, the resource allocation manager may then initiate changes to the application resource set, e.g., by reconfiguring or transferring components of the application onto more powerful hardware or software platforms. The resource allocation manager 180 may have to submit change requests to the other service managers involved to implement the changes—e.g., to the virtual computing service manager 110, the storage service manager 112, or the database service manager 114. In at least some embodiments, before making certain types of resource assignment changes, the application owner's approval may have to be obtained. In one embodiment, the resource allocation service may collect metrics on the effectiveness of its own analysis, decisions and recommendations, and may use machine learning or other techniques to improve its effectiveness over time.

FIG. 2 illustrates of an example application workflow 266 from an end-user perspective, which may be used for resource assignment decisions according to at least some embodiments. The application whose end-user interactions are illustrated may, for example, implement a retail store website from which various products may be purchased by the users. The workflow or interaction sequence shown in FIG. 2 may be specified by the application owner to the resource allocation service in some embodiments. End users may enter the web site by directing their browser application to a website home page 302. They may then typically browse some number (e.g., "n" in the depicted example) of product pages 204 before submitting a purchase via a form on order submit page 206. A confirmation of the order may be provided via page 208.

In the depicted example, respective performance goals 250 (e.g., 250A, 250B, 250C or 250D) may be defined for each page that is accessed, and/or for the workflow as a whole (goal 250E). In some embodiments, the resource allocation manager may receive the performance goals and/or associated thresholds that should trigger re-evaluation of resource assignments from the application owners. In other embodiments, the resource allocation manager may analyze application logs to determine the actual times taken to generate the content of the various pages (e.g., during periods of low workload levels), and may use the results of the analysis to establish performance goals and thresholds. Although end-user workflows expressed as a sequence of web page interactions are depicted in FIG. 2, other types of interactions may be used to define workflows of interest in some embodiments—e.g., some workflows may comprise commands issued via command line interfaces, API invocations, or requests issued by end users via custom GUIs, smartphone or tablet application interfaces, and the like.

In some embodiments, the resource allocation manager may help identify the workflows that should be considered as candidates for triggering resource re-evaluations. For example, either at the request of the application owner or on its own, the resource allocation manager may analyze application logs at various tiers to identify the most common types of end user requests, and may provide the results of such analysis to the application owners. The application owners may in turn combine the request analysis results provided by the resource allocation manager with business considerations (e.g., which types of requests result in the most revenue, or which types of requests result in the greatest estimated impact to customer satisfaction) to arrive at the set of end-user workflows that should be used for potential resource allocation changes. In at least one embodiment, the application owner may let the resource allocation manager decide which end-user workflows should be used for resource allocations. In one embodiment, instead of selecting a subset of end-user interactions as being of greater significance than others, an application owner may indicate that all end-user workflows are of equal importance with respect to resource re-evaluation. Having decided which end-user interactions are to be used for its analysis, the resource allocation manager may then determine the data sources from which metrics that impact the performance of those workflows should be analyzed, and the thresholds that should be used for those metrics. While the application owners may be knowledgeable regarding the business importance of different types of end user interactions, they may at least in some cases have much less expertise in identifying the cause-and-effect relationships between provider network resource allocations and the performance achieved for the end user interactions. The ability of the resource allocation manager to correlate resource assignments with end user workflow interactions may be critical to quickly and effectively resolving performance issues encountered at various applications in different embodiments.

Resource Allocation Manager Components

Figure 3:
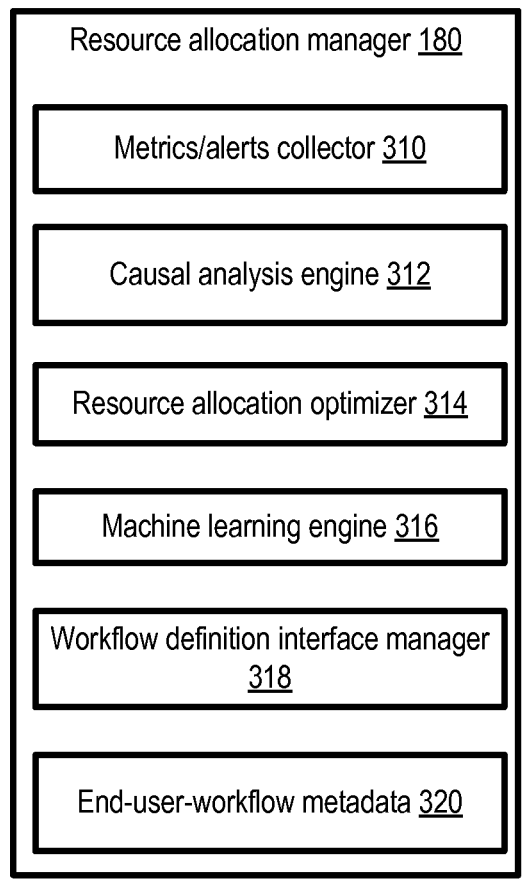
FIG. 3 illustrates example components of a resource allocation manager, according to at least some embodiments.

FIG. 3 illustrates example components of a resource allocation manager 180, according to at least some embodiments. As shown, the resource allocation manager may comprise a metrics/alerts collector 310, a causal analysis engine 312, a resource assignment optimizer 314, a machine learning engine 316, a workflow definition interface manager 318, and a storage component used for end-user workflow metadata 320 in the depicted embodiment. Not all the components shown may be implemented in some embodiments—for example, in one embodiment the machine learning engine may not be used. In at least one implementation, the end-user workflow metadata 320 may be stored in a separate repository such as a database system implemented at the provider network.

The metrics/alerts collector 310 may be responsible for obtaining and organizing performance measurements, alerts and log messages from the resources of various resource sets 152. Depending on the type of metric, either a pull model, a push model, or a combined push-and-pull model may be used for acquiring the metric. In the pull model, the collector may initiate the retrieval of metrics from the metric source (e.g., a performance tool or monitor process running on compute instance or storage device). In contrast, in the push model, the metrics source (such as a process running on behalf of the virtual computing service at an instance host) may initiate the transmission of the metric to the resource allocation manager 180. In some cases, a combination of pull and push techniques may be used—e.g., by default a particular metrics source may push metrics to the resource allocation manager, but under some cases the resource allocation manager may submit a request to the metrics source. In at least one embodiment, the metrics/alerts collector 310 may include the logic used to identify the subset of metrics sources from which metrics pertinent to a given end-user workflow should be collected. In one embodiment in which user-defined alerts are supported (as opposed to pre-defined alerts of the service), the metrics/alerts collector may define various new alerts pertinent to end user workflow performance.

Causal analysis engine 312 may be responsible in the depicted embodiment for determining correlations between metrics/alerts collected from different sources, and identifying possible causes that could have contributed to problematic metrics values or alerts (e.g., values or alerts that lead to meeting threshold conditions for re-evaluation of resource allocations). In doing so, causal analysis engine 312 may utilize various filtering techniques to reduce the size of the metrics/alerts set to be analyzed in some embodiments, e.g., by determining the appropriate relevance windows and/or using application topology information or a knowledge of application semantics. In at least some embodiments, application owners may provide input into the causal analysis process, e.g., by submitting entries to a knowledge base maintained by the resource allocation service regarding causes of specific types of application behaviors. Such a knowledge base may be grown over time, based on the analyses performed by the resource allocation manager 180 as well as based on input from application owners, and may also be used to improve the effectiveness of the resource allocation service using machine learning or other self-tuning approaches.

Resource assignment optimizer 314 may be configured to select the specific types of resources to be acquired (or released) to achieve a desired outcome with respect to end user workflows. For example, if the causal analysis engine determines that the most likely reason that a workflow response time exceeded a target threshold is that there was insufficient memory available at a particular Tier-p server, the resource assignment optimizer may determine that the Tier-p server should utilize a "large" instance rather than a "small" instance to avoid exceeding the response time threshold. In some embodiments the resource assignment optimizer may also be responsible to initiate the configuration changes to achieve the desired outcome, e.g., by issuing respective requests to assign the appropriate new resource to the application, save the state of an application component at its current platform, and restart the application component at the new resource.

Machine learning engine 316 may be used in some embodiments to analyze the effectiveness of one or more of the other components of the resource allocation manager 180, e.g., to determine whether the parameters used to trigger resource re-evaluations are appropriate, how well the rules or heuristics used for causal analysis are working, and/or the extent to which the resource assignment choices made are achieving the desired objectives. Feedback from the machine learning engine 316 may be used, for example, to select more effective configuration changes, more useful parameters or rules for causal analysis, and so on. Any of various types of machine learning techniques may be employed in different embodiments, including linear regression, classification, clustering, and the like. In some embodiments, the machine learning engine 316 may use the causal analysis knowledge base mentioned above.

Workflow definition interface manager 318 may implement the interfaces usable by customers of the resource allocation service, such as application owners 160, to specify the definitions of workflows of interest, as well as associated metadata such as thresholds to be used to trigger resource re-evaluations, constraints (such as budget limits or restrictions on allowed resource assignment changes), and the like. The end-user workflow metadata 320 collected by workflow definition interface manager 318 may be stored in a persistent end-user metadata store in some embodiments. In some embodiments, the metadata may include representations of application topology and/or semantics that can be used for resource re-evaluation analysis. It is noted that the resource application manager 180 (and/or one or more of its components shown in FIG. 3) may be implemented using a distributed set of hardware and/or software elements in at least one embodiment. In at least one embodiment, the resource application manager 180 may be implemented as a component of an enhanced deployment service to which application owners may indicate some combination of application executables, end-user workflow goals, metrics and/or associated thresholds, allowing the enhanced deployment service to make resource allocation and re-allocation decisions as needed to meet end-user workflow goals.

Metrics Sources

Figure 4:
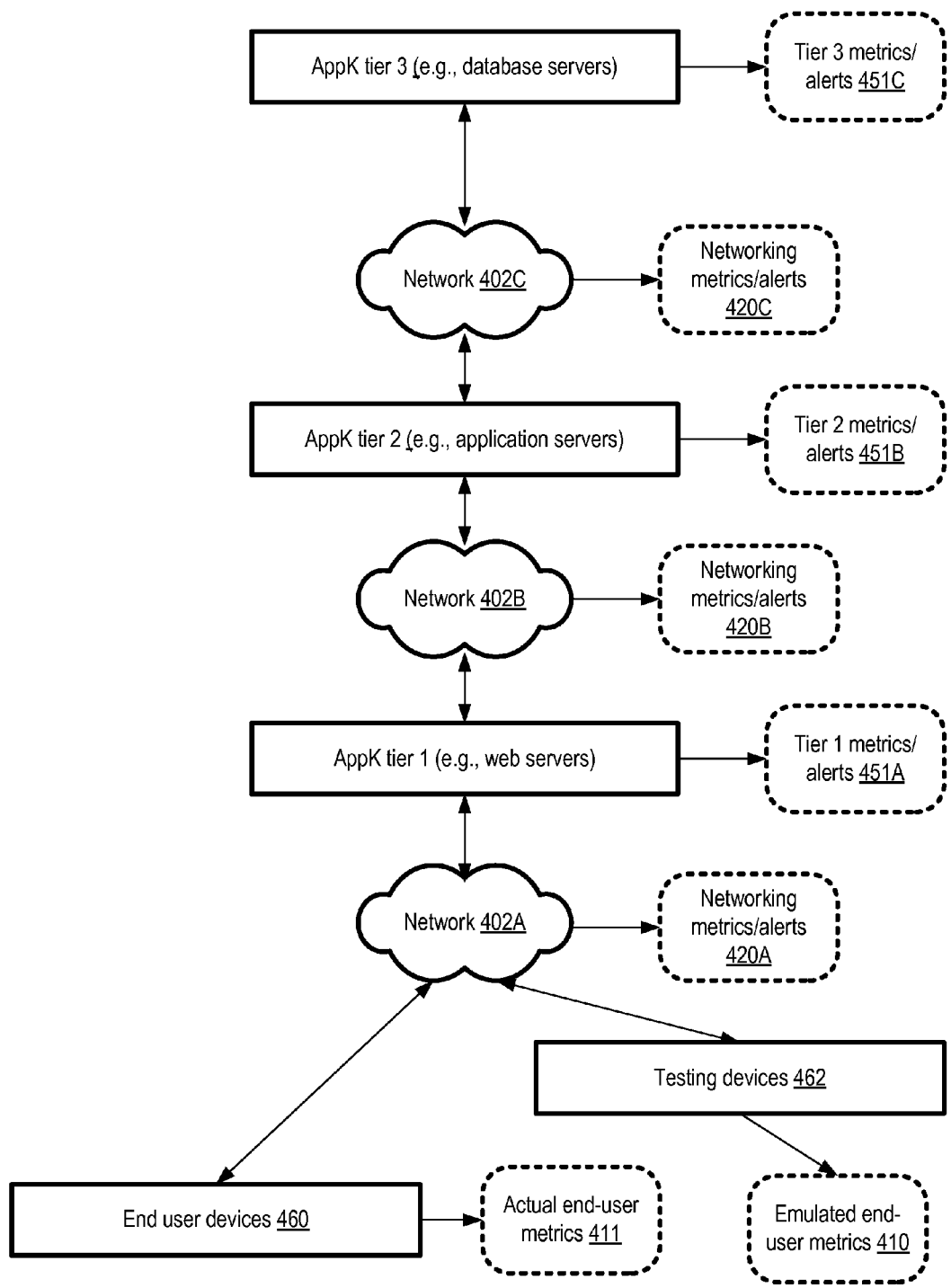
FIG. 4 illustrates examples of sources of metrics and alerts that may be collected for a multi-tier application hosted at a provider network, according to at least some embodiments.

FIG. 4 illustrates examples of sources of metrics and alerts that may be collected for a multi-tier application hosted at a provider network, according to at least some embodiments. In the depicted embodiment, application requests may originate at end-user devices (e.g., tablets, laptops, desktops, smartphones and the like) and be submitted to a front-end tier ("tier 1") of the application "AppK", such as a web server tier along with associated load balancers, over a first set of network paths 402A. At least a portion of the first network paths 402A may in some cases comprise links of the public Internet and/or third party networks that are not under the control of the provider network operator. From tier 1, internal representations of at least some components of the end-user requests may be transmitted over internal network paths 402B to tier 2 resources of the application (e.g., an application server layer). Similarly, internal requests generated at tier 2 on behalf of the end user requests may be sent via internal network paths 402C to tier 3 resources (e.g., a database server layer). Responses to the internal requests may flow in the opposite direction—e.g., from tier 3 to tier 2 via network 402C, from tier2 to tier 1 via network 402B, and from tier 1 to the end user devices via network 402A.

In at least some embodiments, some combination of performance metrics, log messages and/or alerts may be obtained from each of the tiers of the application and the networks between the tiers. Metrics/alerts 451A, 451B and 451C may be collected from hardware and/or software resources at tier 1, tier 2 and tier 3 respectively. Networking metrics 420A, 420B and 420C may be collected from hardware and/or software networking components of network paths 402A, 402B and 402C respectively. For example, various pre-installed operating system performance tools, and/or tools implemented at the virtualization software management stack (such as a hypervisor or an administrative instance of an operating system), may be invoked by a metrics collection process or processes at instance hosts. Networking protocol stacks such as the TCP/IP (Transmission Control Protocol/

Internet Protocol) software stack) as well as networking devices (such as routers, gateways, switches, network interface cards and the like) may be instrumented to collect metrics and alerts associated with network traffic flow in some embodiments.

In at least one embodiment, actual end-to-end metrics 411 of request-response performance for various workflow components (such as individual web pages similar to those shown in FIG. 2) may be collected at the end user devices 460, and such metrics may also be provided to the resource allocation service. In some embodiments, the resource allocation service may attempt to emulate at least some aspects of the end user experience, e.g., by submitting application requests from testing devices 462 and measuring how long it takes to receive the corresponding responses. Such emulated end-user metrics 411 may serve as reasonable approximations to real end user metrics 410, and may be especially useful in environments in which the real end user metrics are not available to the resource allocation service. In some embodiments, resources of the provider network (e.g., resources in a different data center than the targeted tier 1 resources to which the emulated requests are sent) may be used as testing devices 462, while in other embodiments, resources external to the provider network (e.g., resources obtained from third-party testing services with test sources located at various geographical locations around the world) may be used.

Topology and Time-Window Based Analysis

Figure 5:
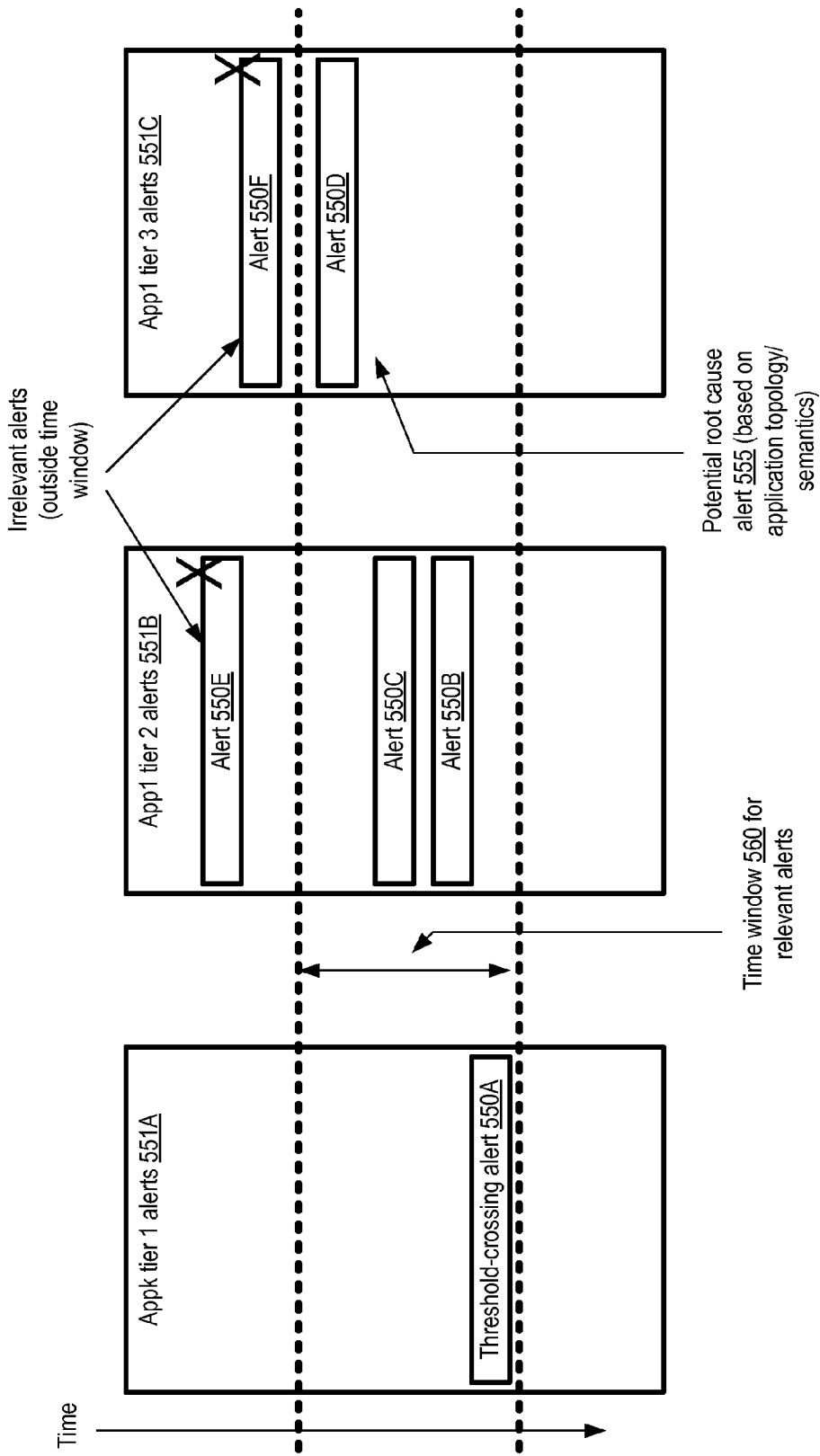
FIG. 5 illustrates an example of a time-window based causal analysis technique that may be used to determine whether application resource allocation should be modified, according to at least some embodiments.

In some embodiments, as mentioned earlier, very large quantities of metrics may be collected, especially for complex applications with numerous concurrent end users. Filtering techniques may be applied in such embodiments to reduce the time it may otherwise have taken to perform causal analysis for various events, such as alerts that indicate that a threshold conditions has been met for triggering a resource re-evaluation. FIG. 5 illustrates an example of a time-window based causal analysis technique that may be used to determine whether application resource allocation should be modified, according to at least some embodiments. In the depicted embodiment, respective alerts pertinent to end-user workflow performance may be defined at, and collected from, three tiers (tier 1, tier 2, and tier 3) of an application. In embodiments in which the application owner uses a configuration script or service to assign the initial set of resources for each tier, the resource allocation service may be able to identify the components of the different tiers of the application based on the scripts used by the application owner and/or based on records of the operation of the configuration service. As indicated by the arrow labeled "Time", alerts generated earlier are shown closer to the top of FIG. 5, while alerts generated later are shown closer to the bottom.

Based on the thresholds used to trigger resource re-evaluation analyses, a particular alert 550A at tier 1 may be identified as a threshold-crossing alert by the resource allocation manager 180 in the depicted example scenario. As mentioned earlier, in practice a series of alerts collected over a time period may be used collectively as a trigger in at least some embodiments, instead of the single alert 550A illustrated in FIG. 5. In order to determine the cause or causes of the threshold-crossing alert 550A, the resource allocation manager 180 may examine alerts collected during time-window 560 at each of the tiers of the application. Thus, alerts 550E and 550F at tier 2 and tier 3 may be designated as irrelevant (as indicated by the "X" symbols), at least with respect to an initial causal analysis, as they do not fall within the relevance time window 560. The resource allocation manager 180 may use its knowledge of the application topology or semantics (including, for example, knowledge about the flow of internal requests and responses associated with various end user workflows) to determine the time windows and/or the order in which various alerts should be analyzed in some embodiments. Thus, for example, for a web-based application that includes a database tier 3, the resource allocation manager 180 may decide to examine database layer alerts within the relevance time window 560 (such as alert 550D) as a possible root cause 555 of a problem detected at tier 1, before examining alerts at tier 2 as possible root causes. Such an ordering may be based, for example, on the realization that if a database alert were generated within a relevance time window, the probability that the underlying problem (such as a lack of sufficient memory or CPU capacity) which caused the database also caused the alerts at other tiers (which depend on the results of the database operation) is higher than the probability that problems at other tiers caused the database alert. Of course, if the tier 3 alert 550D is found to be unrelated to the alerts at tier 2, the tier 2 alerts 550C and 550B may be examined as possible root causes. In some embodiments an iterative approach to time windows may be used, in which if a probable root cause is not isolated when a relevance time window TW1 is used, a wider time window TW2 may be used for a subsequent iteration of root cause analysis. A representation of an application's topology may be stored together with the workflow metadata of the application in at least some embodiments by the resource allocation service.

Example Resource Allocation Changes

Figure 6:
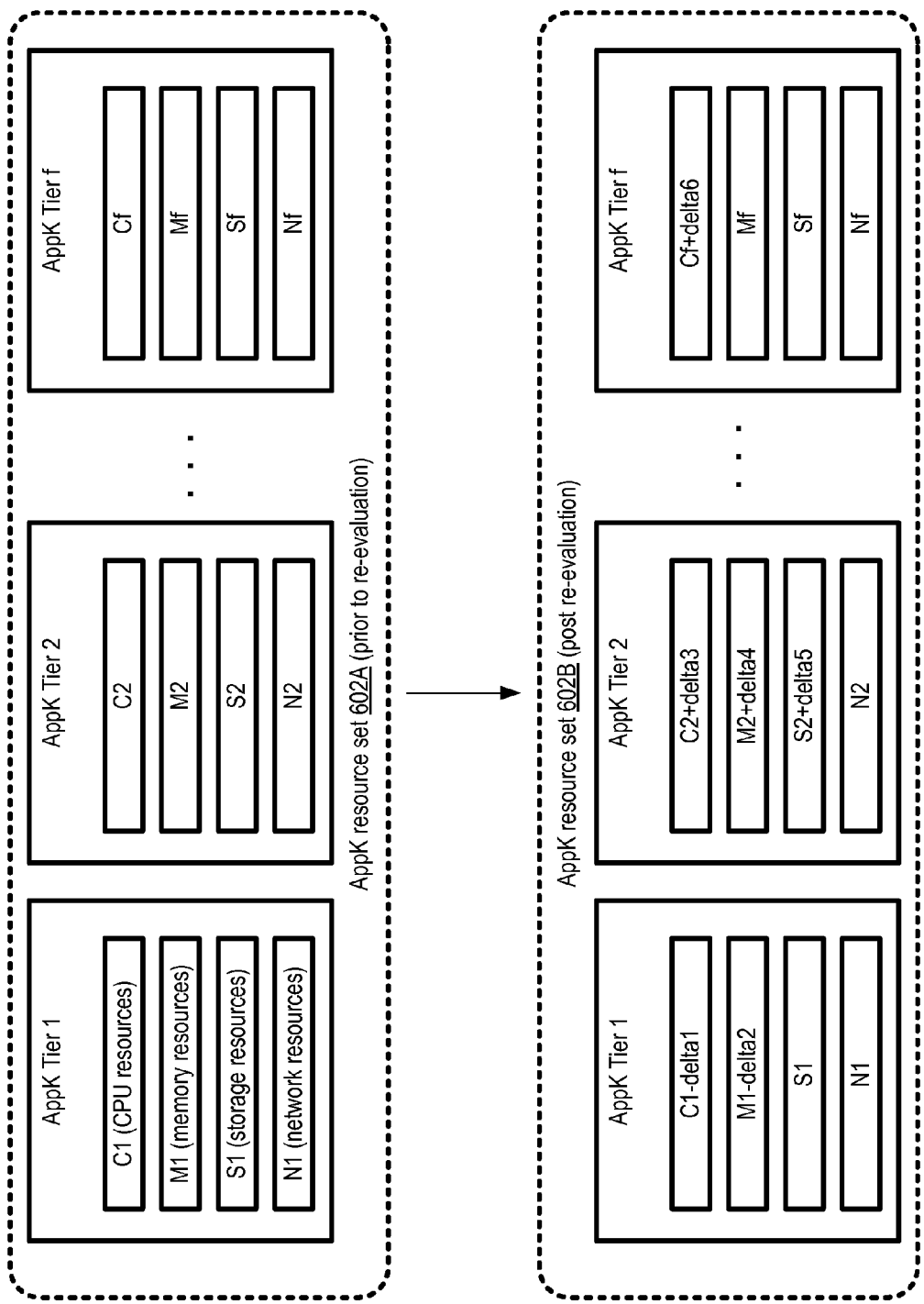
FIG. 6 illustrates examples of changes to application resource allocations that may be performed based on analysis of end-user workflow metrics, according to at least some embodiments.

FIG. 6 illustrates examples of changes to application resource allocations that may be performed based on analyzing end-user workflow metrics, according to at least some embodiments. Application AppK's resource set 602A is organized into "f" tiers in the depicted embodiment. Each tier includes CPU resources (with the assigned capacity indicated by the initial letter "C"), memory resources (indicated by "M"), storage resources (indicated by "R") and network resources (indicated by "N"). Prior to a re-evaluation iteration, the total resource capacity at AppK's tier 1 is C1 units of CPU capacity, M1 units of memory capacity, S1 units of storage capacity and N1 units of network capacity. The resource capacities may be expressed in various units in different embodiments—e.g., CPU capacity may be expressed in ratios relative to a computing unit selected by the provider network operator, memory capacity may be expressed in gigabytes and/or memory accesses per second, storage capacity may be expressed in terabytes and/or I/O operations per second, and network capacity may be expressed in gigabits per second in one embodiment. Tier 2 may have been assigned a total resource capacity of C2, M2, S2 and N2 for CPU, memory, storage and network, while Tier f may have been assigned Cf, Mf, Sf and Nf capacity for the four types of resources being considered.

In the depicted embodiment, the resource allocation manager may decide to change resource assignment changes for the different resource types independently—e.g., an increase to CPU resource capacity may not have to be accompanied by an increase in memory capacity. Furthermore, resource assignments to one application tier may be made independently of resource assignments to other application tiers. Based on its analysis of collected metrics and their impact on end user workflow performance, the resource allocation manager has determined the following resource assignment changes to AppK's original resource set 602A in the depicted example. At tier 1, CPU capacity is to be decreased by delta1 units and memory capacity is to be decreased by delta2 units, while other capacities are to remain unchanged. At tier 2, CPU capacity is to be increased by delta3 units, memory capacity is to be increased by delta4 units, and storage capacity is to be increased by delta5 units; network capacity is to remain unchanged. For tier f, the CPU capacity is to be increased by delta6 units while other resource capacities are to remain unchanged.

In at least some implementations, fewer resource assignment changes may be implemented at one time than are shown in FIG. 6, especially if and when the impacts of the combined changes cannot be predicted with great accuracy. For example, instead of making all the illustrated changes in one iteration, the resource allocation manager 180 may instead only make the change at tier f and measure the impact of that change for some time before reaching a decision as to whether changes at other resources and/or tiers are to be implemented.

The manner in which resource allocation changes are implemented may differ from one embodiment to another. In some embodiments, for example, at least some of the application tiers may comprise some number of virtual machines instantiated on some set of hosts. The physical resources assigned to a given virtual machine may comprise some fraction of the physical resources available on its host. The amount of each resource that is assigned to a given virtual machine may be modified by the virtualization management software components (e.g., the hypervisor) running on the host. Accordingly, as long as the changes to the resource allocations can be accommodated at the current host, such changes may be implemented by issuing commands to the virtualization management software. If a particular change (e.g., an increase to the CPU capacity from Cf to (Cf+delta6)) cannot be accommodated using the hosts that are currently being used, the application component may be transferred to another host. Such a transfer may involve, for example, saving a snapshot of the state of the application component on persistent storage (e.g., at a storage service of the provider network), terminating the processes being used for the component at the original host, starting corresponding processes on a different host with a greater performance capacity, recovering the state of the application component from persistent storage, and reconnecting the component to other components or tiers of the application. In one embodiment, one or more provider network services whose resources are used by the application may offer "live migration" capabilities, in which case a transition to a different host may be implemented without pausing the application component's execution.

Figure 7:
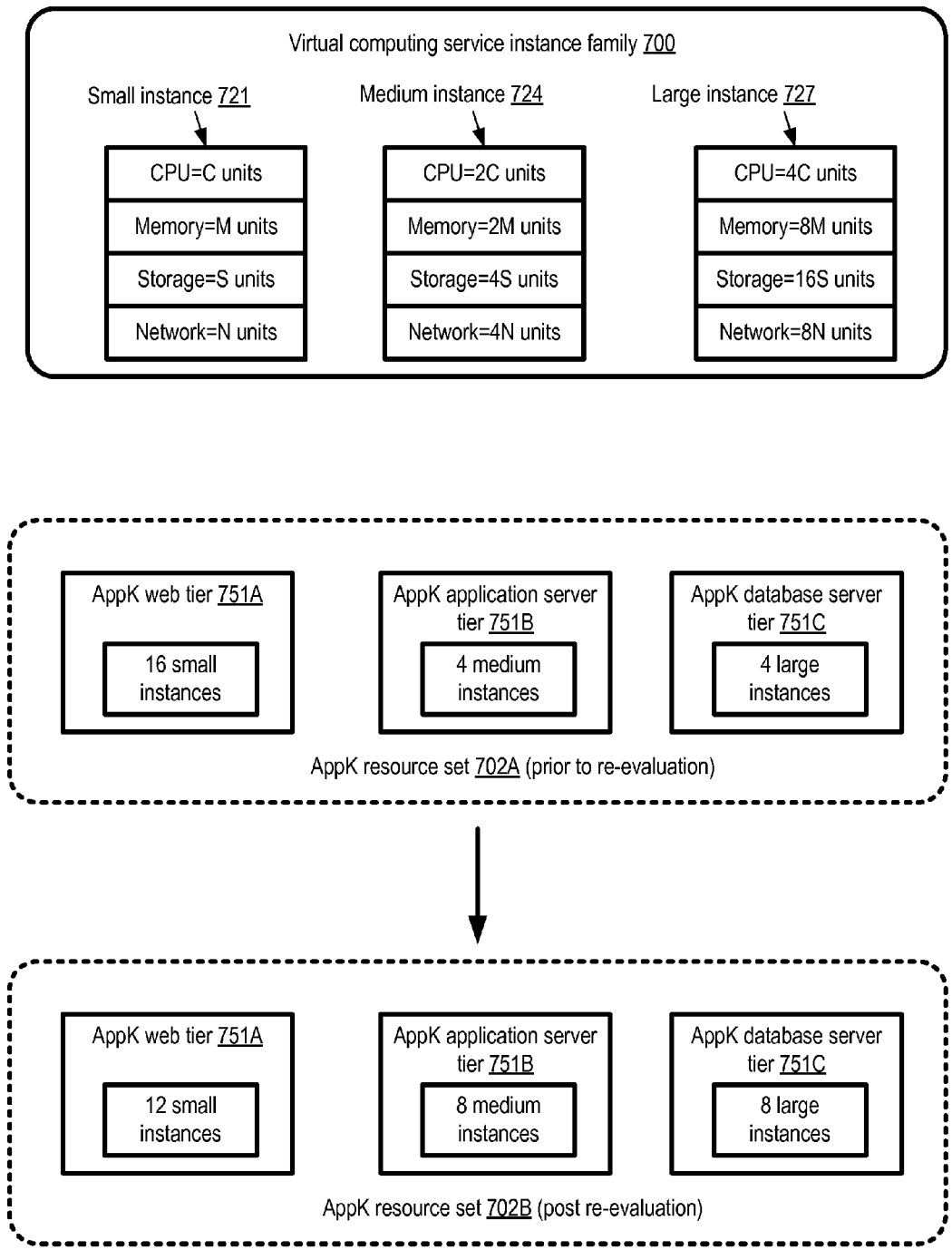
FIG. 7 illustrates examples of changes to application resource allocations that may be performed in a provider network environment where a family of compute instance categories is supported, according to at least some embodiments.

In some embodiments, as mentioned earlier, the virtual computing service 110 of a provider network 102 may support a discrete set of compute instances types or categories (which may be referred to as an "instance family"), each with a respective set of functional and performance characteristics or profiles. In such a scenario, the types of changes that can be made to application resource assignments may sometimes be limited by the performance profiles of the different supported instance categories; that is, arbitrary changes to resource capacity such as those illustrated in FIG. 6 may not always be feasible. FIG. 7 illustrates examples of changes to application resource allocations that may be performed in a provider network environment where a family of compute instance categories is supported, according to at least some embodiments. In the depicted embodiment, an instance family 700 comprising "small", "medium" and "large" instances is supported. The CPU, memory, network and storage capacities of a small instance 721 are C, M. N and S units respectively. For medium instances, the corresponding capacities for the four types of resources are 2C, 2M, 4N and 4S, while large instances have a CPU capacity of 4C, a memory capacity of 8M, storage capacity of 16S and network capacity of 8N units. Other categories of instances (such as "extra-large") and/or other ratios of resource capacities may be supported in other embodiments.

When making resource allocation changes in the embodiment depicted in FIG. 7, the resource allocation manager 180 may select a target number of instances of one or more supported instance categories for each tier of the application. In the example scenario illustrated, for example, prior to a resource re-evaluation, application AppK's resource set 702A includes 16 small instances in a web tier 751A, 4 medium instances in an application server tier 751B, and 4 large instances in a database tier 751C. After the re-evaluation, the modified resource set 702B includes 12 small instances in the web tier, 8 medium instances in the application server tier, and 8 large instances in the database tier. Given the discrete set of instance categories supported, it may not be straightforward for the resource allocation manager to make some combinations of changes—e.g., it may not be easy to decrease the CPU capacity of the web tier while simultaneously increasing the memory or networking capacity of the web tier. In such scenarios, the resource allocation manager may have to prioritize among the different types of resource allocation changes at a given tier of the application that may be recommended as a result of the resource re-evaluation analysis. If, for example, increasing the networking capacity at the web tier is expected to have a greater overall benefit for the application (for example, in terms of revenue generated for the application owner) than decreasing the CPU capacity at the web tier (which could help lower cost), the resource allocation manager may decide to implement the network capacity increase even if it results in an unnecessary increase in CPU capacity.

Methods for Application Resource Assignment Based on End-User Workflow Metrics

Figure 8:
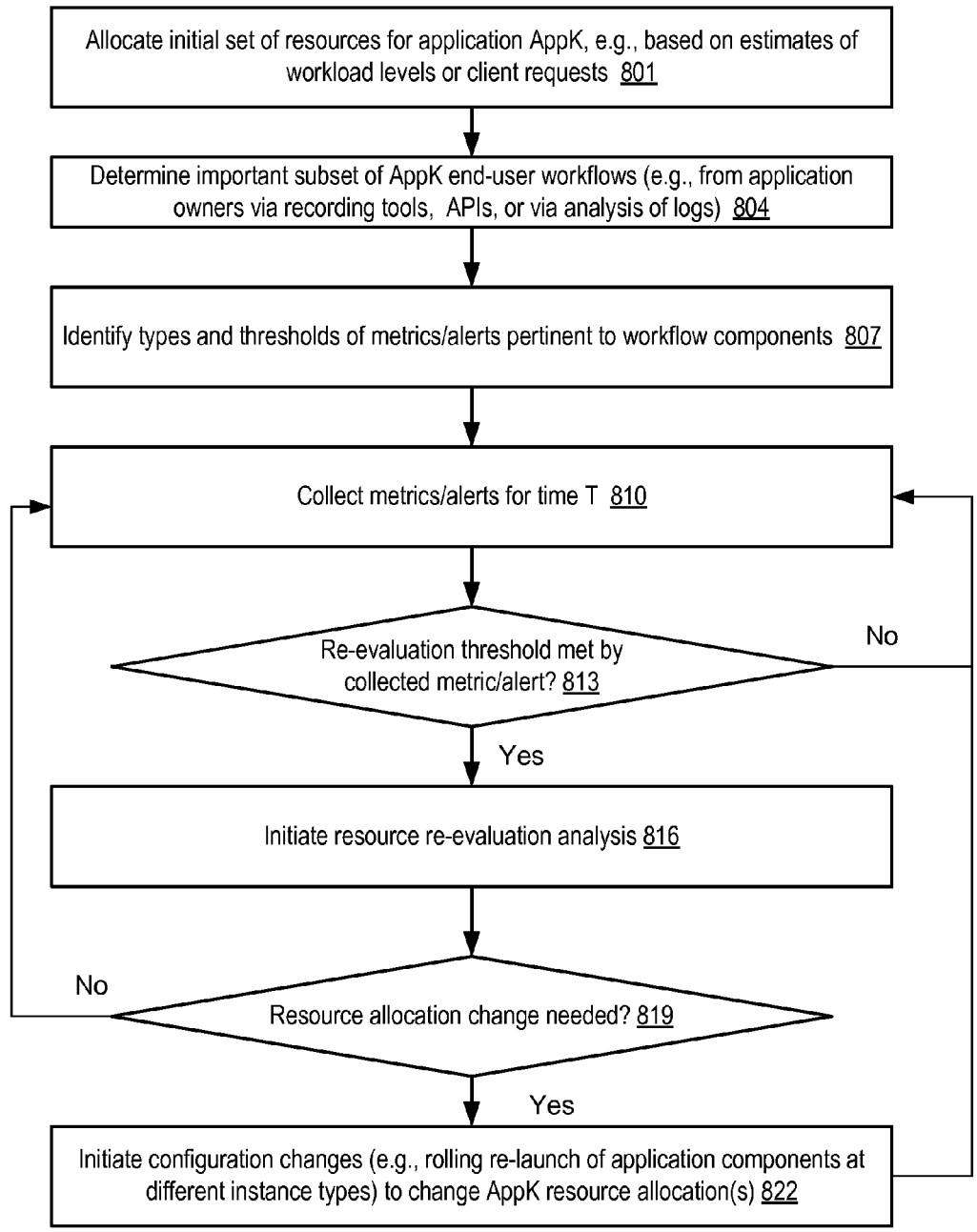
FIG. 8 is a flow diagram illustrating aspects of operations that may be performed to adjust resource allocations for applications hosted at provider networks based on analysis of end-user workflow metrics, according to at least some embodiments.

FIG. 8 is a flow diagram illustrating aspects of operations that may be performed to adjust resource allocations for applications hosted at provider networks based on analysis of end-user workflow metrics, according to at least some embodiments. As shown in element 801, an initial set of resources may be allocated or assigned at a provider network for an application AppK. In some embodiments, the application owner may programmatically specify the initial resources needed at one or more tiers of the application, e.g., using a script or other programmatic interface supported by the provider network. The application owner may determine the initial set of resources based on pre-release testing, for example, with some assumptions regarding expected end-user workload trends. For an application with a web server layer, an application server tier and a database tier, for example, in a provider network environment in which small, medium and large compute instances are supported, the application owner may indicate how many compute instance of each instance category are to be included at each tier initially.

Some number of end-user interaction sequences or interactions may be identified, to be used to determine when/if resource allocation changes are to be implemented for AppK (element 804). In some embodiments, a resource allocation service of the provider network may implement one or more programmatic interfaces or tools that allow the application owner to record the sequence of interactions that constitute a given workflow of interest, and provide the recoding to the resource allocation service. In other embodiments, respective sequences of commands (e.g., issued using a command-line interface or API) representing the end-user workflows of interest may be provided to the resource allocation service. In at least one embodiment, instead of or in addition to receiving representations of the end-user workflows that the application owner deems significant or important for resource re-allocation decisions, the resource allocation service may identify candidate end-user workflows from application logs and/or other sources, e.g., based on how often such workflows occur and/or based on an analysis of the resource usage levels of the candidate workflows. In some embodiments, the application owner may use business criteria (e.g., revenue generation) to identify important end-user workflows. In other embodiments, all the workflows may be considered equally important, at least initially. The set of end-user workflows whose results are to be examined for resource re-assignment purposes may be changed over time in at least some embodiments—e.g., having initially indicated that all workflows are to be considered equally important, the application owner may later decide to prioritize a subset of the workflows over others and may indicate the more important workflows to the resource allocation service. In some embodiments, the application owner may indicate the start and end interactions of a workflow to the service, and the service may then divide the workflow into a sequence of constituent components or sub-workflows for more fine-grained analysis.

For a given set of end-user workflows (or workflow components) selected for application AppK, the resource allocation service may identify the metrics that are to be collected, as well as the thresholds for those metrics that are to trigger resource re-evaluation analyses (element 807). In some implementations, the application owner may specify at least some of the metrics (e.g., end-to-end elapsed time for request/response sequences) and/or thresholds. In at least one embodiment, the resource allocation service may determine internal metrics (e.g., CPU utilizations at various tiers of the application, network latencies between the tiers, and the like) that are relevant to the end-user workflow performance goals/requirements, and/or the corresponding thresholds. Various types of metrics may be selected in different embodiments, including the output of operating-system performance tools, alerts generated by operating system components or application management tools, and the like. The provider network services (e.g., a virtual computing service, a storage service, or a database service) being used by the application may already be collecting at least some internal metrics in some embodiments, and the resource allocation service may identify the relevant subsets of such metrics to collect for its purposes. When defining thresholds for the metrics, the resource allocation service may in some embodiments take a sequence of measurements or events into account, so that the likelihood of triggering resource re-assignments based on temporary fluctuations is reduced. For some performance metrics, the result of a statistical analysis of several successive point values collected over a time period may be compared with a threshold value, for example, instead of comparing a single point value. Similarly, for thresholds based on some types of alerts, a plurality of alerts may have to be generated during a selected time period in order to trigger resource allocation re-evaluation.

The selected metrics may be collected from their sources over some time period T (element 810). For some metric sources, a component of the resource allocation service may use a pull model, in which for example respective requests for the latest set of metrics may be sent to the metrics sources. For other metrics, a push model may be used—e.g., the sources may push the metrics to the resource allocation service. In some cases, a component of the service (e.g., metrics/alerts collector 310 shown in FIG. 3) may subscribe to be notified as soon as certain events or alerts occur. If one or more of the collected metrics or alerts meet a resource re-evaluation threshold for AppK (as detected in element 813), the service may initiate an analysis to determine whether it may be advisable to modify the resource set assigned to AppK (element 816). Such an analysis may include correlating metrics or alerts generated at different tiers, e.g., based on relevance time windows and/or application topology/semantics considerations, and determining the root cause of the metric or metrics reaching their threshold level(s). If the resource allocation service determines that one or more changes to AppK's resource set are warranted (element 819), the configuration changes required may be initiated (element 822). The resource assignments may include adding resource capacity for some application components or tiers, reducing resource capacity for some application components or tiers, or both types of changes. In some embodiments, for example, the application owner may have specified a budget constraint, and in order to increase resource capacity for some components of the application AppK while still remaining within the budget constraints, the resource allocation service may reduce resource capacity at one application tier while increasing capacity at another tier. In embodiments in which a provider network service being used for AppK supports a discrete set of resource categories (such as the instance family 700 shown in FIG. 7), the resource set changes may be implemented by transferring AppK's processes and/or data from a resource of one category to a resource of a different category. Live migration of the processes may be used in some such embodiments, while in other embodiments the processes may be quiesced temporarily (after their state information is saved) for the transfer. Rolling transfers of processes from one resource category to another may be used in one embodiment. For example, if a decision is made to transfer AppK processes P1, P2, P3 and P4, each currently running on a respective small instance, to four large instances, P1 may be quiesced and transferred first while P2, P3 and P4 continue responding to application requests so that the AppK does not become unavailable. After P1 is brought back online in such a rolling transfer, P2 may be quiesced and transferred, and so on.

If resource re-evaluation is not triggered by the metrics collected during time period T, e.g., if none of the triggering criteria are met (as also determined in element 813), the service may continue collecting metrics for a subsequent time interval. In some cases, during resource re-evaluation analysis, the service may determine that no changes to AppK's current resource assignment are currently advisable (e.g., in operations corresponding to element 819), and the service may continue collection of metrics for subsequent intervals in this scenario as well. A decision not to make any changes to AppK's resource set may be reached, for example, if the service fails to identify a clear resource-related root cause of the threshold condition. In some scenarios, budget constraints or constraints on the types of resource instances available for use by AppK may lead to a decision not to change the resource set.

It is noted that in various embodiments, operations other than those illustrated in the flow diagram of FIG. 8 may be used to implement the techniques of using end-user workflow metrics to make resource assignment decisions for applications hosted at provider networks. Some of the operations shown may not be implemented in some embodiments or may be implemented in a different order, or in parallel rather than sequentially.

Use Cases

The techniques described above, of identifying representative or important end-user workflows or interaction sequences for different hosted applications, and correlating the user experience of those workflows with internal resource assignment changes within the hosting network may be useful in a variety of environments. As more and more applications are migrated to provider networks, and as a wider and more complex set of the resource choices is offered by the provider networks (e.g., instance families in the case of virtual computing services), it may become harder for application owners to keep track of the types of resources that would lead to the best overall performance from the end-user perspective. While the application owners may be best suited to identifying end-user workflows, the provider network may be in a much better position to collect the types of metrics, and perform the types of cross-application-tier analysis, that can identify root causes of poor end-user performance than the application owners. In addition, a resource allocation service of the kind described herein may be used over time by a wide variety of application owners, and may therefore be able to improve its causal analysis and decision making capabilities (e.g., using machine learning or other similar techniques) based on a much larger set of resource assignment optimization attempts than would be possible for a single application owner.

Illustrative Computer System

Figure 9:
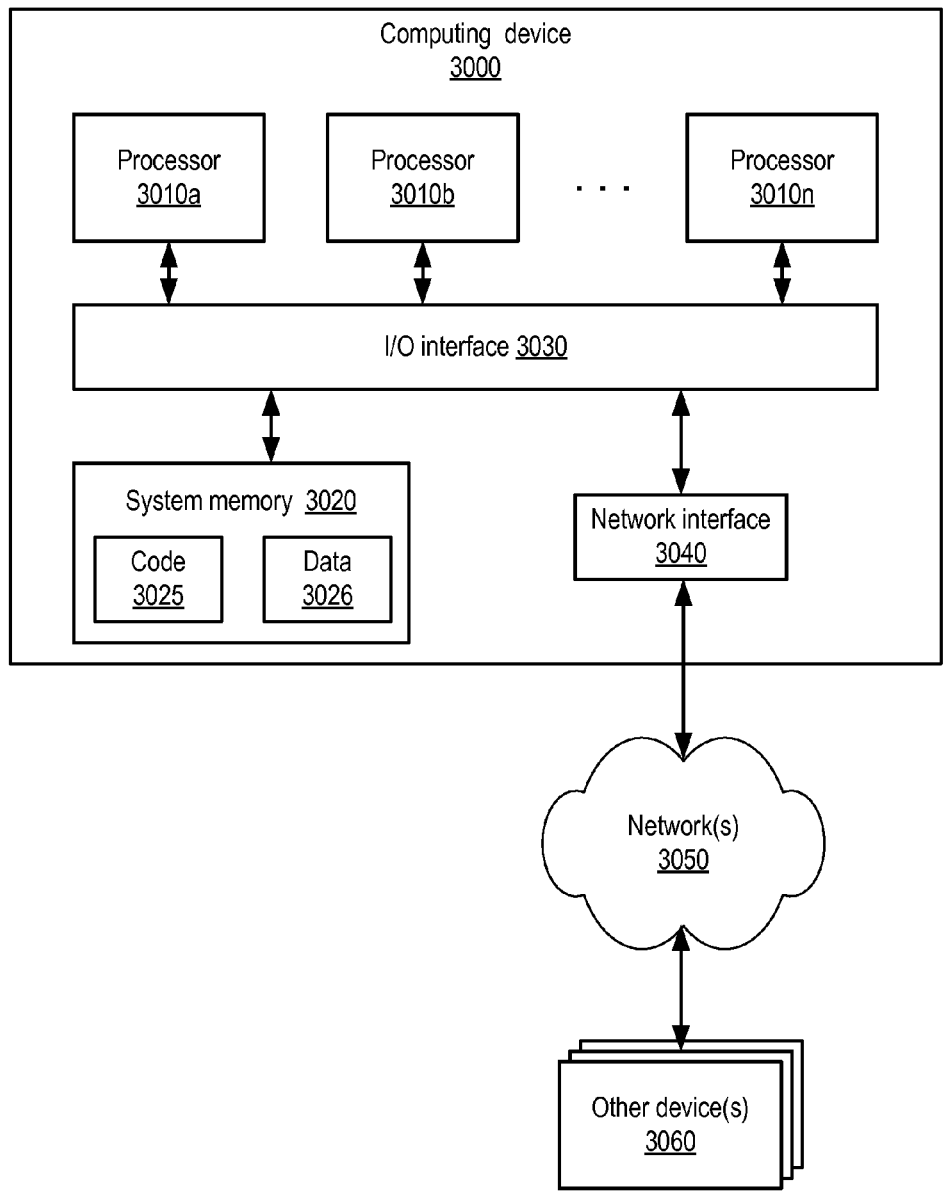
FIG. 9 is a block diagram illustrating an example computing device that may be used in at least some embodiments.

In at least some embodiments, a server that implements a portion or all of one or more of the technologies described herein, including the techniques to implement the various components of a resource allocation service (such as a resource allocation manager 180) may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
    allocate a set of provider network resources to an application deployed on behalf of a particular customer, wherein a virtual computing service of the provider network supports a plurality of compute instance categories that differ from each other in one or more performance capabilities, and wherein the set of provider network resources comprises a particular compute instance of a first compute instance category of the plurality of compute instance categories;
    receive, from the particular customer via a programmatic interface, an indication of one or more end-user workflows associated with the application;
    collect respective sets of performance metrics associated with each end-user workflow of the one or more end-user workflows;
    initiate, based at least in part on a determination that a particular performance metric of a particular end-user workflow of the one or more end-user workflows meets a threshold criterion, a resource re-evaluation analysis associated with the application;
    determine, during the resource re-evaluation analysis, that the set of provider network resources is to be modified; and
    implement one or more configuration changes to modify the set of provider network resources, wherein the one or more configuration changes include a replacement of the particular compute instance by a different compute instance of a second compute instance category of the plurality of compute instance categories.

2. The system as recited in claim 1, wherein the one or more end-user workflows comprise a generation of a response to at least one request received at the application via a variant of HTTP.

3. The system as recited in claim 1, wherein the one or more computing devices are configured to:
    receive, from the particular customer, an indication of the threshold criterion.

4. The system as recited in claim 1, wherein the one or more computing devices are further configured to:
    initiate a submission, to the application from a selected request source, of one or more requests emulating at least a portion of the particular end-user workflow; and
    determine that the particular performance metric meets the threshold criterion based at least in part on values of respective performance metrics collected for the one or more requests.

5. The system as recited in claim 1, wherein the one or more computing devices are further configured to:
    instrument a networking component used for a request of the particular end-user workflow to determine whether the particular performance metric meets the threshold criterion.

6. A method, comprising:
performing, by one or more computing devices:
    allocating a set of provider network resources to an application deployed on behalf of a particular customer;
    identifying one or more end-user workflows associated with the application;
    collecting respective sets of performance metrics associated with each end-user workflow of the one or more end-user workflows;
    initiating, based at least in part on a determination that a particular performance metric of a particular end-user workflow of the one or more end-user workflows meets a threshold criterion, a resource re-evaluation analysis associated with the application; and
    implementing one or more configuration changes to modify the set of provider network resources in accordance with a result of the resource re-evaluation analysis.

7. The method as recited in claim 6, wherein said identifying the one or more end-user workflows comprises receiving, from the customer via a programmatic interface, an indication of the one or more end-user workflows.

8. The method as recited in claim 6, wherein the one or more end-user workflows comprise a generation of a response to at least one request received at the application via a variant of HTTP.

9. The method as recited in claim 6, further comprising performing, by the one or more computing devices:
    receiving, from the customer, an indication of the threshold criterion.

10. The method as recited in claim 6, further comprising performing, by the one or more computing devices:
    submitting, to the application from a selected test device, one or more work requests emulating at least a portion of the particular end-user workflow; and
    determining that the particular performance metric meets the threshold criterion based at least in part on values of respective performance metrics collected for the one or more work requests.

11. The method as recited in claim 6, further comprising performing, by the one or more computing devices:

instrumenting a networking component used by the application to determine whether the particular performance metric meets the threshold criterion.

12. The method as recited in claim 6, further comprising:
measuring respective response times of a plurality of end-user interactions with the application;
determining that the particular performance metric meets the threshold criterion based at least in part on a statistical analysis of the respective response times.

13. The method as recited in claim 6, further comprising performing, by the one or more computing devices:
configuring a set of alerts at respective resources associated with the particular performance metric, wherein an alert record corresponding to at least one alert of the set of alerts is stored in a log in response to a determination that the particular performance metric meets the threshold criterion; and
selecting a particular alert record from the log for inclusion in the resource re-evaluation analysis based at least in part on a relevance time window determined for the particular performance metric.

14. The method as recited in claim 13, further comprising performing, by the one or more computing devices:
storing a representation of a network topology of the application; and
selecting the particular alert record from the alert log for inclusion in the resource re-evaluation analysis based at least in part on a location within the topology of a source of the particular alert record.

15. The method as recited in claim 6, further comprising performing, by the one or more computing devices:
utilizing a machine learning technique to select a particular configuration change of the one or more configuration changes.

16. The method as recited in claim 6, wherein the set of provider network resources includes a first resource with first performance capacity and a first billing rate, wherein the one or more configuration changes includes replacing the first resource with a second resource with a lower performance capacity and a lower billing rate.

17. A non-transitory computer-accessible storage medium storing program instructions that when executed on one or more processors:
identify one or more end-user workflows associated with an application deployed at a set of provider network resources on behalf of a customer;
collect respective sets of performance metrics associated with each end-user workflow of the one or more end-user workflows;
initiate, based at least in part on a determination that a particular performance metric of a particular end-user workflow of the one or more end-user workflows meets a threshold criterion, a resource re-evaluation analysis associated with the application; and
implement one or more configuration changes to modify the set of provider network resources in accordance with a result of the resource re-evaluation analysis.

18. The non-transitory computer-accessible storage medium as recited in claim 17, wherein the instructions when executed on the one or more processors:
receive, from the customer via a programmatic interface, an indication of the one or more end-user workflows.

19. The non-transitory computer-accessible storage medium as recited in claim 17, wherein the instructions when executed on the one or more processors:
receive, from the customer, an indication of the threshold criterion.

20. The non-transitory computer-accessible storage medium as recited in claim 17, wherein the instructions when executed on the one or more processors:
initiate a submission, to the application from a selected test device, of one or more requests emulating at least a portion of the particular end-user workflow; and
determine that the particular performance metric meets the threshold criterion based at least in part on values of respective performance metrics collected for the one or more requests.

* * * * *